Patented June 5, 1945

2,377,401

UNITED STATES PATENT OFFICE 2,377,401

PREPARATION OF BETA-ALANINE

Gustaf H. Carlson, Pearl River, and Charles N. Hotchkiss, Spring Valley, N. Y., assignors to Lederle Laboratories, Inc., New York, N. Y., a corporation of Delaware No Drawing. Application June 25, 1942, Serial No. 448,491

4 Claims. (Cl. 260—534)

This invention relates to the preparation of beta-aminopropionic acid (beta-alanine) and more particularly, to a single step process for the preparation of beta-aminopropionic acid from acrylonitrile and ammonium hydroxide.

Beta-aminopropionic acid has recently become an important intermediate for use in the preparation of pantothenic acid, and accordingly, a good commercially practicable process for the preparation of this intermediate is indicated. Numerous methods for the synthesis of beta-aminopropionic acid have appeared in the literature tabulated in Clarke and Behr, Organic Syntheses, XVI, 1 (1936), but none of them shows any promise as a production method. For example, the most satisfactory method involving the Hofmann degradation of succimide results in poor overall yields and at an unreasonably high cost per pound due to the expensive, involved, and tedious technique involved.

We have discovered a single, easily controlled and inexpensive commercial process for the manufacture of beta-aminopropionic acid which results in a product, easily isolated, of such a degree of purity that it can be utilized directly, without further purification, for the preparation of pantothenic acid. Moreover, almost theoretical overall yields are obtainable.

According to the present invention acrylonitrile and ammonium hydroxide are heated in a pressure vessel for a period of time ranging from one to twenty-four hours at an elevated temperature to produce beta-aminopropionic acid. Pure crystals of the beta-aminopropionic acid may be obtained by dilution of the concentrated reaction mixture with methanol. It is desirable, although not necessary to the process, to incorporate in the reaction mixture a small quantity of a corrosion and oxidation inhibitor such as, for example, diphenyl amine.

It is an advantage of the present invention that beta-aminopropionic acid may be produced directly from acrylonitrile by a relatively simple and easily controlled reaction in a single operation. No isolation of any intermediate product is necessary.

It is a further advantage of the present invention that the only reactants essential for the operation of the process are acrylonitrile and ammonium hydroxide, both of which are inexpensive and readily available.

It is another advantage of the present invention that beta-aminopropionic acid is produced inexpensively in almost theoretical overall yields.

It is still another advantage of the present invention that the beta-aminopropionic acid prepared by its process is of such a purity as to be suitable for direct use in the preparation of pantothenic acid; no further purification is necessary.

The invention will be described in greater detail in conjunction with the following specific examples. These are merely illustrative, and it is not intended to limit the scope of the invention to the details therein set forth. The parts are by weight unless otherwise stated.

Example 1

A mixture of 66.5 parts (1.25 mols) of acrylonitrile, 540 parts of 28% ammonia, 1375 parts of water and 1.5 parts of diphenylamine in which the ammonia concentration was 8.6% and that of the acrylonitrile 3.3% was heated in an autoclave for eight hours at 150° C. The reaction mixture was filtered, treated with activated carbon, at about 70° C., again filtered, and the filtrate evaporated to a syrupy consistency. The syrupy residue was dissolved in about 100 ml. of methanol, whereupon 39 parts of beta-aminopropionic acid having a melting point of 192°–194° C. crystallized out. Yield: 35%.

Example 2

A mixture of 133 parts (2.5 mols) of acrylonitrile, 135 parts of 2.8% ammonia, 625 parts of water, and 2 parts of diphenylamine in which the ammonia concentration was 19.1% and that of the acrylonitrile 6.1% was heated in an autoclave for eight hours at 150° C. The reaction mixture was then filtered and the filtrate evaporated to a syrupy consistency. The syrupy residue was diluted with 200 ml. of methanol and 63 parts of beta-aminopropionic acid crystallized out. Yield: 28.3%.

Example 3

The procedure of Example 2 was followed except that the reaction mixture was heated at 175° C. for four hours. Fifty-one parts of beta-aminopropionic acid were obtained. Yield: 23%.

Example 4

A mixture of 66.5 parts (1.25 mols) of acrylonitrile, 630 parts of 28% ammonia, 1370 parts of water and 1 part of diphenylamine in which the ammonia concentration was 10% and, that of acrylonitrile 3.0% was heated for four hours at 175° C. The reaction mixture was treated as described in Example 1 and 37 parts of beta-aminopropionic acid were obtained. Yield: 33%.

Example 5

A mixture of 132 parts (2.5 mols) of acrylonitrile, 600 parts of 28% ammonia, 1080 parts of water and 2 parts of diphenylamine in which the ammonia concentration was 10% and that of the acrylonitrile 7.3% was heated in a pressure vessel for four hours at 200° C. After the usual treatment of the reaction mixture, 60 parts of beta-aminopropionic acid were precipitated from methanol solution. Yield: 27%.

A reaction mixture containing 132 parts (2.5 mols) of acrylonitrile, 300 parts of 28% ammonia, 1380 parts of water and 2 parts of diphenylamine in which the ammonia concentration was 5% and that of the acrylonitrile 7.3% was treated in a similar manner and 59 parts of beta-aminopropionic acid were obtained. Yield: 26.6%.

Two additional charges—one containing 132 parts (2.5 mols) of acrylonitrile, 900 parts of 28% ammonia, 780 parts of water and 2 parts of diphenylamine (ammonia concentration 15%; acrylonitrile, 7.3%) and the other containing 132 parts (2.5 mols) of acrylonitrile, 120 parts of 28% ammonia, 1560 parts of water and 2 parts of diphenylamine (ammonia concentration, 2.35%; acrylonitrile, 7.3%)—were also treated in the same manner. Sixty parts and 30 parts, respectively, of aminopropionic acid were obtained. Yield: 37%; 13.5%.

Example 6

132 parts (2.5 mols) of acrylonitrile were added slowly with stirring to 1680 parts of cold 20% ammonia containing 4.5 parts of diphenylamine. The solution, containing an acrylonitrile concentration of 7.3%, was kept cold and stirred for three hours at which time all the acrylonitrile had dissolved. It was then placed in a pressure vessel and stirred at 200° C. for four hours.

The resulting solution was processed according to the usual procedure and 60 parts of beta-aminopropionic crystallized from the methanol diluent. Yield: 27%.

Example 7

2.1 lbs. (0.039 lb. mol) of acrylonitrile, 21.4 lbs. of 28% ammonia, 43.7 lbs. of water, and 27 gs. of diphenylamine, said mixture having an ammonia concentration of 9.9% and an acrylonitrile concentration of 3.0%, were heated in an autoclave at 150° C. for eight hours. The reaction mixture was then processed essentially as described in the foregoing examples and 1.33 lbs. of beta-aminopropionic acid were obtained. Yield: 37.5%.

Example 8

4.3 lbs. (0.081 lb. mol) of acrylonitrile, 42.7 lbs. of 28% ammonia, 22.2 lbs. of water and 14 gs. of diphenylamine were treated as described in Example 6. This reaction mixture contained 18.5% NH₃ and 6.2% acrylonitrile. 0.95 lb. of beta-aminopropionic acid was obtained. Yield: 13.2%.

Example 9

A reaction mixture identical with that of Example 7 was heated to 200° C. for only four hours and the solution processed as usual. 1.82 lbs. of beta-aminopropionic acid were recovered. Yield: 25.8%.

Example 10

16 lbs. (0.3 lb. mol) of acrylonitrile, 146 lbs. of 28% ammonia, 56 lbs. of water, and 100 gs. of diphenylamine, said mixture containing 6.3% NH₃ and 7.35% acrylonitrile, were heated for four hours at 195°–200° C. 6.81 lbs. of beta-aminopropionic acid were isolated in the usual manner. Yield: 25%.

Example 11

The solutions remaining after crystallization of beta-aminopropionic acid in Examples 1–6, inclusive, were evaporated to reclaim the methanol. A mixture of 224 parts of the residue, 600 parts of 28% ammonia, 1080 parts of water, and 2 parts of diphenylamine was heated for four hours at 200° C. After processing in the usual manner, 54 parts of beta-aminopropionic acid were obtained. Yield: 24%.

Example 12

226 parts of the residue obtained as in Example 11, together with 600 parts of 28% ammonia, 1080 parts of water and 2 parts of diphenylamine, were heated for four hours at 200° C. and the resulting solution treated as described in the preceding examples. Sixty parts of beta-aminopropionic acid were obtained. Yield: 26.6%.

Example 13

A number of further reactions were carried out which followed the same procedure but in which the concentration of the ammonium hydroxide solution was varied from 2% to 28% while the proportions of acrylonitrile based on the proportion of ammonia were varied accordingly, temperatures from 150° C. to 250° C. were employed, and the time of heating was varied from one to twenty-four hours.

In every case embodied in the foregoing examples which employed widely varying operating conditions, beta-aminopropionic acid was obtained. A careful comparison of the examples will, however, indicate the most ideal of these operating conditions for commercially practicable production.

The best percentage yields are obtained when low concentrations of ammonia and acrylonitrile are heated at higher temperatures for shorter reaction times (see Examples 1 and 4). However, as may be seen from the results of Example 2, it is commercially more practicable to utilize high concentrations, sacrificing percentage yield (6.7% decrease in Example 2 as compared with Example 1) to weight yields (61% increase in weight of product obtained in Example 2 as compared with Example 1). Example 3, compared with Example 2, shows that only slightly decreased yields result when the time of reaction is cut in half and the temperature is raised.

Examples 5 and 6 were designed to determine the optimum ammonia concentration. Concentrations from 5% to 20% result in good yields of beta-aminopropionic acid.

The results of Examples 7–10, inclusive, which were on a larger scale bear out the above conclusions as to concentrations of reactants, times of heating and reaction temperatures.

The highest percentage yield obtained in any of the foregoing examples was about 35% of the theoretical. Since only very drastic changes in reactant concentrations increased this yield at all, it is probable that the reaction reaches an equilibrium. The results of Examples 11 and 12 bear out this equilibrium theory since they show that residues from one operation may be treated with an additional quantity of ammonium hydroxide in the same manner to produce another yield of beta-aminopropionic acid of the same order of magnitude as obtained in the initial operation from the reaction of acrylonitrile and ammonium hydroxide. Thus it will be seen that a given amount of acrylonitrile may be converted almost quantitatively, by the process of the present invention, into the desired product; the extreme commercial importance of this feature is obvious.

The beta-aminopropionic acid produced by our process, may, if desired, be converted to an acid salt such as the hydrochloride or to a salt of a metal such as an alkali or alkaline earth metal, and isolated in this form. I prefer, however, to isolate the beta-aminopropionic acid directly from the concentrated syrupy reaction product by diluting it with absolute methanol. When so isolated, the beta-aminopropionic acid is in a pure form and may then, if desired, be converted to the salts when they are required as intermediates in processes for producing pantothenic acid.

Methanol appears to be peculiarly suited for the above isolation or crystallization step. Attempts to dilute with various other aliphatic alcohols, such as ethanol and propanol, have been unsatisfactory.

In the reaction between acrylonitrile and ammonium hydroxide under the conditions described above, it may be desirable in some instances to add other substances to the reaction mixture. For example, dehydration catalyst, ammonium salts of weak acids such as ammonium carbonate, inhibitors, anti-oxidants, and other suitable reagents for slightly altering the course or speed of the reaction may be added.

What we claim is:

1. The process of preparing beta-aminopropionic acid which comprises heating a mixture of acrylonitrile and aqueous ammonium hydroxide at a temperature ranging from about 150° C. to about 225° C.

2. The process of preparing beta-aminopropionic acid which comprises heating a mixture of acrylonitrile and aqueous ammonium hydroxide to about 200° C. for about four hours.

3. The process of producing beta-aminopropionic acid which comprises heating a mixture of acrylonitrile with aqueous ammonia at a temperature of from about 150° C. to about 225° C. for from about one to about twenty-four hours, concentrating the reaction mixture to a syrup, and diluting the syrup with methanol to cause precipitation of beta-aminopropionic acid.

4. The process of producing beta-aminopropionic acid which comprises heating acrylonitrile with aqueous ammonia at a temperature of from about 150° C. to about 225° C. for from about one to about twenty-four hours, concentrating the reaction mixture to a syrup, diluting the syrup with methanol, collecting the precipitated beta-aminopropionic acid, concentrating the residue, and heating said residue with aqueous ammonia at a temperature of from about 150° C. to about 225° C. for from about one to about twenty-four hours to produce a further quantity of beta-aminopropionic acid.

GUSTAF H. CARLSON.
CHARLES N. HOTCHKISS.